(12) United States Patent  
McCutcheon et al.

(10) Patent No.: US 7,712,595 B2  
(45) Date of Patent: May 11, 2010

(54) CLUTCH RELEASE BEARING ASSEMBLY

(75) Inventors: Steven E. McCutcheon, Fort Wayne, IN (US); James L. Whitaker, Hicksville, OH (US)

(73) Assignee: Eaton Corporation, Cleveland, OH (US)

( * ) Notice: Subject to any disclaimer, the term of this patent is extended or adjusted under 35 U.S.C. 154(b) by 557 days.

(21) Appl. No.: 11/708,249

(22) Filed: Feb. 20, 2007

(65) Prior Publication Data

US 2008/0196993 A1 Aug. 21, 2008

(51) Int. Cl.
*F16D 23/14* (2006.01)
*F16D 13/74* (2006.01)

(52) U.S. Cl. .................. 192/98; 192/110 B; 192/113.5; 384/606

(58) Field of Classification Search .................. 384/606
See application file for complete search history.

(56) References Cited

U.S. PATENT DOCUMENTS

| | | | | |
|---|---|---|---|---|
| 3,672,478 | A * | 6/1972 | Riese et al. .................... | 192/98 |
| 4,204,720 | A * | 5/1980 | Otani ........................... | 192/98 |
| 4,534,458 | A * | 8/1985 | Ladin ........................... | 192/98 |
| 4,598,808 | A * | 7/1986 | Flotow ......................... | 192/98 |
| 4,771,874 | A * | 9/1988 | Leigh-Monstevens ........ | 192/98 |
| 6,371,266 | B1 * | 4/2002 | Gochenour et al. ........... | 192/98 |
| 6,446,778 | B1 * | 9/2002 | Cole et al. .................... | 192/98 |

OTHER PUBLICATIONS

Figure 1: System Nomenclature. Figure 1 is a general depiction of a clutch system and provides a description of the nomenclature used throughout this description.

Figure 2: Standard Eaton greaseable bearing assembly (front). Shows a common release bearing assembly used with clutches. This particularly shows the Eaton assembly, but other greaseable bearing designs mimic the same features and functions.

Figure 3: Standard Eaton greaseable bearing assembly (bottom). Shows a common release bearing assembly used with clutches. This particularly shows the Eaton assembly, but other greaseable bearing designs mimic the same features and functions.

Figure 4: View showing the inside of the standard Eaton greaseable bearing assembly (cover not shown). Provides nomenclature for the components of the release assembly.

Figure 5: Cross section of the Eaton greaseable bearing assembly. Shows the cross section of Figure 4.

Figure 6: Enlarged view of Eaton greaseable bearing assembly cross section showing grease flow. Demonstrates some of the inefficiencies of the current release bearing designs.

Figure 7: Eaton sealed bearing assembly. Shows a standard bearing assembly using a sealed bearing design. The sealed bearing helps address the issue of bearing contamination.

* cited by examiner

*Primary Examiner*—Rodney H Bonck
(74) *Attorney, Agent, or Firm*—Brooks Kushman P.C.

(57) ABSTRACT

A clutch release bearing assembly is provided that includes a housing that encloses a bearing, release sleeve and bushing. The housing defines a reservoir for grease that is supplied to the bearing and bushing. Slots are provided in the release sleeve through which grease is provided to the bushing and the input shaft through holes formed in the bushing. An end cap seal prevents contaminants from entering the clutch release bearing assembly on one end and a multi-lip seal is provided between the housing and release sleeve on the other end of the housing.

20 Claims, 3 Drawing Sheets

CLUTCH RELEASE BEARING ASSEMBLY

BACKGROUND OF THE INVENTION

1. Field of the Invention

The present invention relates to a clutch release bearing assembly for a vehicle powertrain that is manually greased to lubricate a bearing and a bushing.

2. Background Art

Vehicles with manual transmissions generally have a clutch release bearing that is used to engage and disengage a clutch. The clutch is interposed between the engine and transmission on the input shaft of the transmission.

The clutch is engaged and disengaged to selectively transfer torque from the engine to the transmission. The clutch transmits torque to the transmission from the input shaft when the clutch is engaged. The clutch release bearing assembly remains stationary relative to the rotating input shaft and clutch. A release fork is manipulated by either a mechanical or a hydraulic linkage which engages the release bearing assembly. When a clutch pedal is depressed, the release fork is rotated by the linkage to cause the release bearing assembly to move parallel to the input shaft. Depression of the clutch pedal releases the clutch and interrupts the flow of torque to the transmission.

The relative motion between the release bearing and the shaft makes it necessary to provide a bushing and a bearing in the clutch release bearing assembly. The bushing and bearing require lubrication to prevent undue wear of the input shaft, bushing and bearing. Lubrication is provided to both the bearing and the bushing of the release bearing assembly to extend the life of the release bearing assembly. Some release bearing assemblies have grease zerks for lubricating the bearing and the bushing at scheduled maintenance intervals. Conventional clutch release bearing assemblies are designed to allow grease to flow to an unsealed bearing. However, current designs fail to provide a direct path for grease to flow from the grease zerk to the bushing.

Alternatively, some clutch release bearing assemblies may have a sealed bearing and a durable bushing. Sealed bearings and durable bushings reduce the need to lubricate the clutch release bearing assembly but are expensive options. Sealed bearings do not require manual or external lubrication because they are sealed to retain lubricant within the bearing assembly. Sealed bearings tend to interfere with the flow of grease to the bushing which may become starved of lubrication. Sealed bearings minimize problems presented by contamination as a result of their sealed construction but do not generally provide an effective way of preventing contamination from reaching the bushing of the clutch release bearing assembly.

A leaf spring may be included in a clutch release bearing assembly for the purpose of preventing an outer race of the bearing from rotating with the inner race of the bearing that rotates with the same angular velocity as the clutch. The use of such a leaf spring increases the cost of the release bearing assembly.

In current clutch release bearing designs, sufficient lubrication may be provided to the bearing when the bearing is relubricated but the flow path of the lubricant may be obstructed by the outer bearing race. At regular service intervals, grease is applied through the zerk until the grease purges through the cover of the release bearing housing. Grease flow to the bearings is indirect in that it must flow in a serpentine path through the bearing before it reaches the input shaft and bushing. Grease may be initially injected into the clutch release bearing when assembled to provide lubrication to the bushing, however, it is difficult to reliably relubricate the clutch release bearing assembly after the vehicle is put into service.

Prior art release bearing designs that do not use a sealed bearing tend to be more subject to contamination of the bearing. With either a sealed bearing or a non-sealed bearing, contamination is not effectively excluded from the bushing because the bushing is left open to contamination.

There is a need for a clutch release bearing assembly that effectively retains grease and excludes contamination from entering and contaminating the bearing and bushing. As summarized below, Applicants have addressed the above problems and have fulfilled the need for a clutch release bearing assembly that provides adequate lubrication to both the bearing and bushing while excluding contamination from the bearing and bushing.

SUMMARY OF THE INVENTION

A clutch release bearing assembly is provided for a clutch that includes a housing in which an input shaft is received. The clutch release bearing assembly is an integral part of a clutch for a vehicle. The input shaft is rotatably retained within a bearing, a release sleeve and a bushing. The housing defines a grease reservoir for receiving and distributing a supply of grease to the bearing and the bushing. The bushing has a side wall that defines plurality of openings. Grease is distributed to the input shaft through the openings defined in the side wall of the bushing.

The release bearing assembly may include other features and elements that provide additional advantages. For example, a seal may be assembled between the housing and the release sleeve on an end of the housing closest to the clutch. In addition, an annular cover seal may be assembled over the end of the housing facing away from the clutch that spans the outer race and extends to the inner race. At least one anti-rotation flange may be formed on the housing that is secured to the clutch to prevent rotation of the housing. In one embodiment, the clutch release bearing assembly may have a grease reservoir on an inboard side of the bearing between the housing and the release sleeve. Grease may flow from the grease reservoir into the space between the inner and outer races and may also flow through the openings in the release sleeve to the bushing.

In an alternative embodiment, a sealed bearing may be provided that has at least one axial side with a seal extending across the space between the inner and outer races on an end of the housing that faces away from the clutch. Another advantageous feature of the clutch release bearing assembly that may be provided is a flange extending radially inwardly from the housing that applies an axial force to the outer race of the bearing to pre-load the outer race thereby fixing the outer race to the housing.

The housing in one illustrative embodiment may be a bell shaped housing having a first opening on a first end in which the sealed bearing is disposed and a second opening on a second end in which the release sleeve is received. The housing may also have an axial flange extending radially inwardly from the first opening that exerts a pre-load force on the sealed bearing to retain the sealed bearing in the housing.

BRIEF DESCRIPTION OF THE DRAWINGS

FIG. 5 is a fragmentary cross-sectional view of a clutch release bearing assembly that is provided with a sealed bearing;

FIG. 6 is a fragmentary cross-sectional view of a clutch release bearing assembly that is provided with a one side sealed bearing; and FIG. 7 is a fragmentary cross-sectional view of a clutch release bearing assembly that is provided with an external seal.

DETAILED DESCRIPTION OF THE PREFERRED EMBODIMENT(S)

Figure 1:
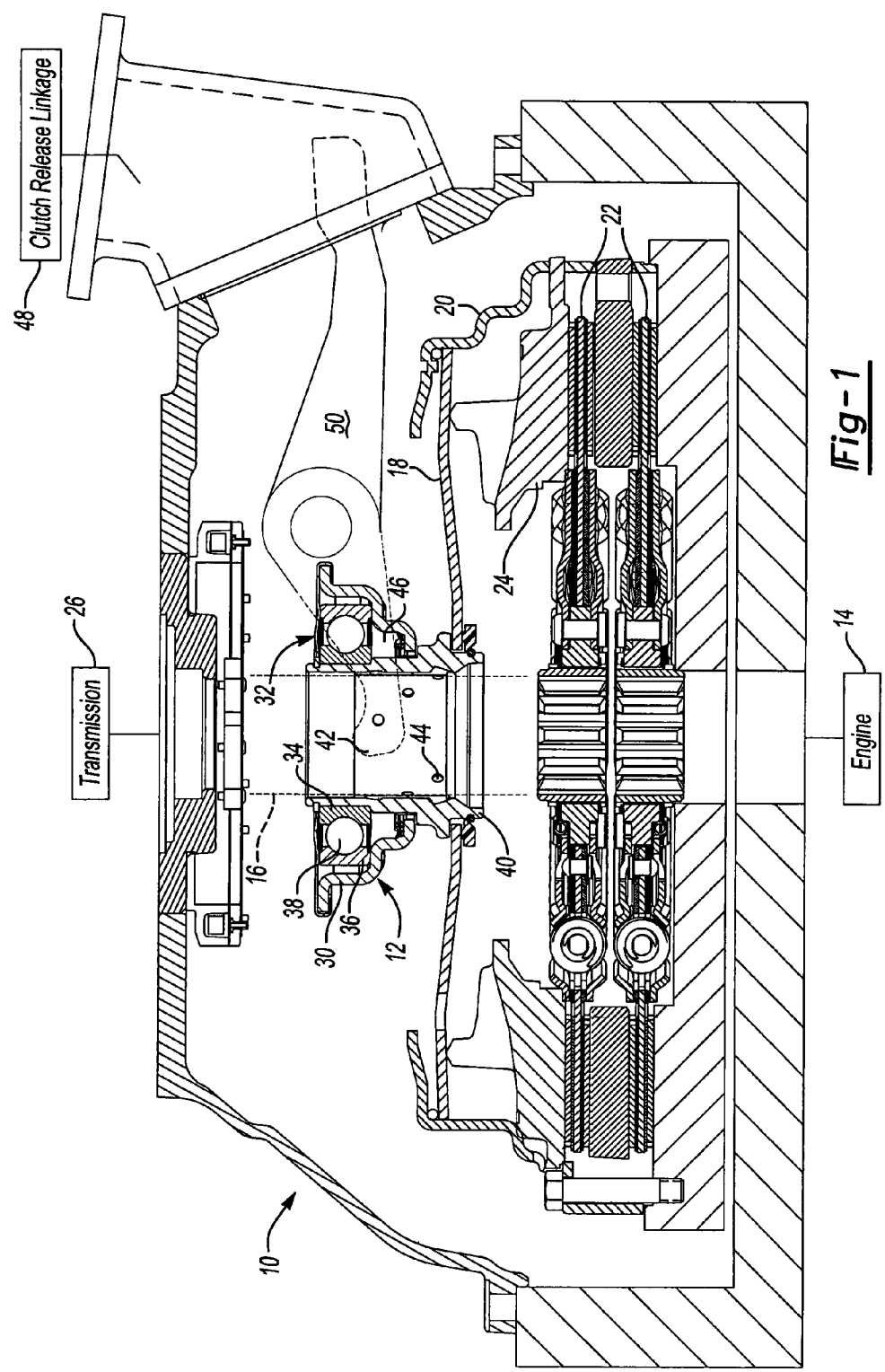
FIG. 1 is a cross-sectional view of a clutch.

Referring to FIG. 1, a clutch is generally indicated by reference numeral 10. The clutch 10 includes a clutch release bearing assembly generally indicated by reference numeral 12. The clutch 10 receives torque from an engine 14 through an input shaft 16. A diaphragm spring 18 is shifted by the clutch release bearing assembly 12. A clutch housing 20 encloses a plurality of clutch discs 22 and a pressure plate 24. The clutch 10 transmits torque from the engine 14 to a transmission 26.

Figure 2:
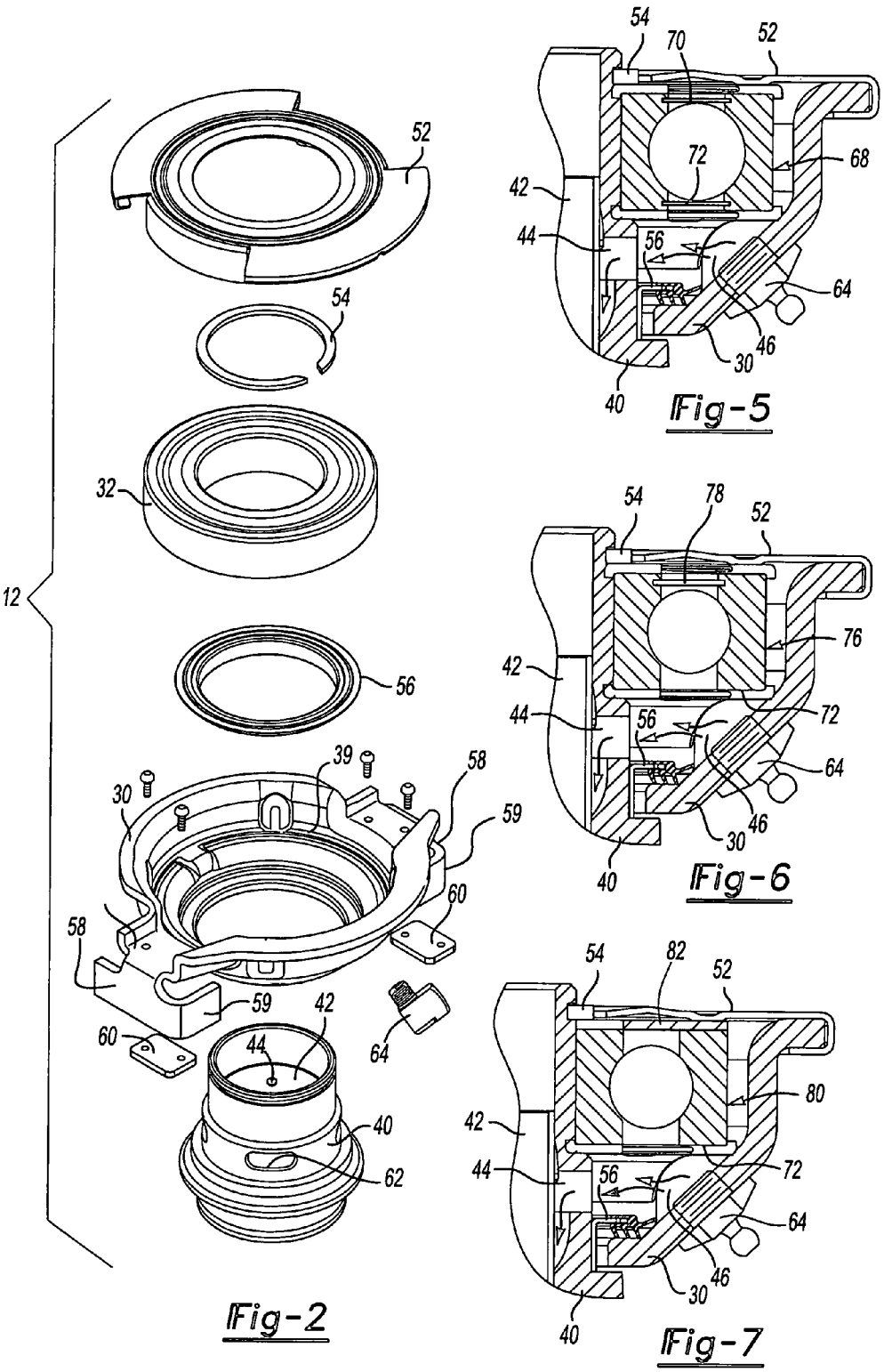
FIG. 2 is an exploded perspective view of a clutch release bearing assembly.
Figure 3:
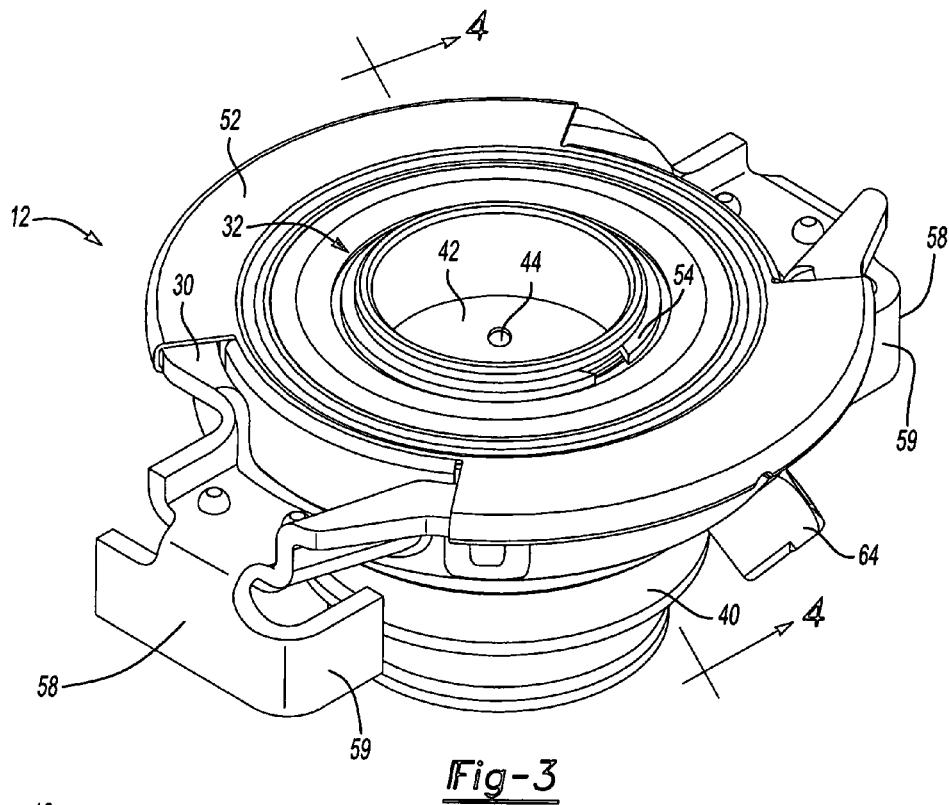
FIG. 3 is a perspective view of an assembled clutch release bearing assembly.

The clutch release bearing assembly 12 includes a clutch release bearing housing 30 that houses a bearing 32. The bearing 32 includes an inner race 34, an outer race 36, and a plurality of ball bearings 38. As shown in FIGS. 2 and 3, a bead of silicone sealant 39 may be provided between the clutch bearing housing 30 and the outer race 36 of the bearing 32 to seal between the outer bearing race 36 and the housing 30. It should be understood that other types of anti-friction bearings may be provided, such as a needle bearing or the like. A release sleeve 40 is disposed about a bushing 42 that is, in turn, received on the input shaft 16. The bushing 42 is press-fit into the release sleeve 40.

The bushing 42 has a plurality of holes 44 through which grease is provided to the input shaft 16. A grease reservoir 46 is provided within the housing 30. Grease from the reservoir 46 is provided to the bearing 32 in the space between the inner race 34 and outer race 36. Grease from the reservoir 46 is also provided to the bushing 42 through the release sleeve 40, as will be more fully described below.

A clutch release linkage 48 is connected to a release fork 50. The release fork 50 engages the clutch release bearing assembly 12 to move the assembly 12 longitudinally along the input shaft 16. The release fork 50 moves the clutch release bearing assembly 12 to engage and disengage the clutch 10 by flexing the diaphragm spring 18.

Referring to FIG. 2, the clutch release bearing assembly 12 is shown in an exploded perspective view. The clutch release bearing housing 30 receives the release sleeve 40 through the end of the housing 30 closest to the transmission in the illustrated embodiment. The bearing 32 is received in the other end of the housing 30.

An end cap seal 52 is fitted over the bearing 32 and is provided to exclude contaminants from entering the clutch release bearing housing 30. The end cap seal 52 excludes contamination from both the bearing 32 and bushing 42 of the clutch release bearing assembly 12. A snap ring 54 secures the bearing 32 within the housing 30 and also secures the bearing to the release sleeve 40. A seal 56 is assembled between the release sleeve 40 and the housing 30. The seal 56 prevents or minimizes leakage of grease between the opening and the end of the housing 30 at the transmission end of the clutch release bearing assembly 12 and the release sleeve 40.

Anti-rotation flanges 58 are provided at opposite sides of the housing 30. The release fork 50 (shown in FIG. 1) may be secured to the anti-rotational flanges 58. The flanges 58 may also have radial flanges 59 that function to prevent the housing 30 from being installed incorrectly. The housing 30 is prevented from rotating with the shaft by means of the anti-rotation flanges 58. Wear plates 60 are assembled to the housing 30 with rivets 61, or other fasteners.

The release sleeve 40 has a plurality of elongated rounded slots 62. Grease from the reservoir 46 is permitted to flow directly from the reservoir 46 into the slots 62. When grease is injected into the reservoir 46 a portion of the grease flows through the elongated rounded slots 62 in the release sleeve 40 and into the holes 44 that are provided in the walls of the bushing 42. It should be understood that the elongated rounded slots 62 formed in the release sleeve 40 alternatively may be round, or may be provided in another shape. A zerk fitting 64 is assembled to the housing 30 to provide a convenient way to inject grease into the reservoir 46 of the housing 30.

Referring to FIG. 3, the clutch release bearing assembly 12 is shown fully assembled. The housing 30 is closed on one end by the end cap seal 52. The end cap seal 52 spans the end of the housing 30 and extends across the outer race 36, ball bearings 38 and inner race 34 (as shown in FIG. 1) and terminates in close proximity to the snap ring 54. The release sleeve 40 is shown enclosing the bushing 42 and also being received in the housing 30. The housing 30 includes anti-rotation flanges 58 and may also include wear plates 60. The wear plates 60 are reaction plates that are engaged by tip of the fork 50. The wear plates 60 are hardened to increase durability.

Figure 4:
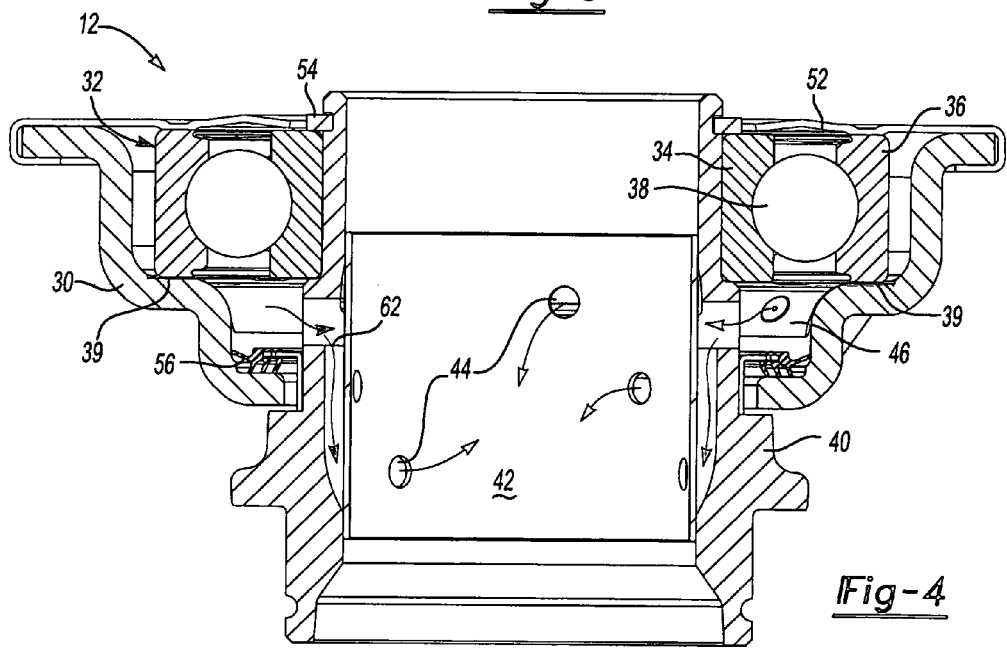
FIG. 4 is a cross-sectional view taken along line 4-4 in FIG. 3.

Referring to FIG. 4, the flow of grease through the clutch release bearing assembly 12 is described in greater detail. Grease is injected into the reservoir 46 through the zerk fitting 64 (shown in FIGS. 2 and 3). From the reservoir 46, grease is provided directly to the bearing 32 with grease being supplied from the reservoir 46 to the ball bearings 38 between the inner race 34 and outer race 36. Grease is also provided from the same reservoir 64 directly to the slot 62, or other openings, in the release sleeve 40. Grease flows through the slots 62 to the bushing 42 and input shaft 16 when grease is injected into the zerk fitting 64 to provide ample lubrication for the bushing 42. The multi-lip seal 56 seals the reservoir 46 to prevent excessive grease leakage between the housing 30 and the release sleeve 40.

The end cap seal 52 is secured to the housing 30 and extends across the outer race 36 to the inner race 34. The end cap seal 52 excludes contamination from the bearing 32 on one end of the clutch release bearing assembly 12. The seal 56 excludes contamination from entering between the release sleeve 40 and housing 30 at the opposite end of the assembly 12. The snap ring 54 retains the bearing 32 within the housing 30 and secures the bearing 32 to the sleeve 40. The end cap seal 52 exerts an axial biasing force against the outer race 36 of the bearing 32. The force applied by the end cap seal 52 to the outer race 36 prevents the outer race 36 from rotating relative to the housing 30 even though the inner race 34 and ball bearings 38 rotate with release sleeve 40, bushing 42 and input shaft 16.

Referring to FIG. 5, an alternative embodiment is shown wherein a sealed bearing 68 is provided within the clutch release bearing housing 30. For brevity, the same reference numerals are used for similar components of the embodiment of FIG. 5 as are used for the embodiment of FIGS. 1-4. The sealed bearing 68 is pre-lubricated and sealed to exclude contaminants and retain the bearing lubricant within the bearing 68. An outer internal seal 70 and an inner internal seal 72 are provided on opposite axial sides of the sealed bearing 68. As shown in FIG. 5, the reservoir 46 need not provide lubrication to the bearing 68, but may be relied upon to provide a direct lubricant path to the bushing 42. Grease in the reservoir 46 is provided to the slot 62 formed in the release sleeve 40, as previously described with regard to the embodiment of FIGS. 1-4. The grease is then, in turn, provided to the bushing through the hole 44 formed in the side wall of the sleeve 40.

Referring to FIG. 6, a one-sided seal bearing 76 is shown that includes an outer internal seal 78 that is provided on the outboard axial side of the bearing 76. In this embodiment, grease in the reservoir 46 is supplied to the slot 62 formed in the release sleeve 40 for the bushing 42 and is also provided to the bearing 76 through the inboard axial side of the bearing 76.

Referring to FIG. 7, another alternative embodiment of a bearing 80 is shown that is provided within the clutch release bearing housing 30. The bearing 80 has an external seal 82 that is attached to the outboard axial side of the bearing 80. The reservoir 46 provides lubrication to the bearing 80 and also provides a direct lubricant path to the bushing 42. Grease in the reservoir 46 is provided to the bushing 42 through the hole 44 formed in the side wall of the sleeve 40.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A clutch release bearing assembly for a clutch, the assembly comprising:
   a housing having a first opening facing the clutch and a second opening facing away from the clutch;
   a release sleeve having a first end and a second end, the first end of the release sleeve received through the first opening of the housing, and the second end of the release sleeve engages the clutch wherein the release sleeve is slidably received on an input shaft;
   a bushing retained in the release sleeve, the bushing having a side wall that defines plurality of openings, wherein the bushing is slidably received on the input shaft;
   a bearing assembled to the first end of the release sleeve, the bearing having an inner race secured to the release sleeve and an outer race that supports the inner race for rotation with the input shaft on anti-friction bearings; and
   wherein the housing defines a grease reservoir in conjunction with the release sleeve and, wherein openings are defined in the release sleeve through which grease is distributed to the bushing, and wherein grease is provided through the bushing to the input shaft through the openings in the side wall of the bushing.

2. The clutch release bearing assembly of claim 1 further comprising a seal assembled between the housing and the release sleeve on adjacent the first opening of the housing.

3. The clutch release bearing assembly of claim 1 further comprising an annular cover seal that is assembled adjacent the second opening of the housing wherein the annular cover seal spans the outer race and extends to the inner race.

4. The clutch release bearing assembly of claim 3 wherein the annular cover seal is secured to the housing such that the housing that applies an axial force to the outer race of the bearing to pre-load the outer race thereby fixing the outer race to the housing.

5. The clutch release bearing assembly of claim 1 further comprising at least one anti-rotation flange formed on the housing that is secured to the clutch to prevent rotation of the housing.

6. The clutch release bearing assembly of claim 1 wherein the bearing has an inboard side that faces the clutch and an outboard side that faces away from the clutch and wherein the grease reservoir is defined on the inboard side of the bearing between the housing and located between the inboard side of the bearing and the second end of the release sleeve.

7. The clutch release bearing assembly of claim 6 further comprising a zerk fitting through which the grease is injected into the grease reservoir.

8. The clutch release bearing assembly of claim 1 wherein the grease flows from the grease reservoir between the inner and outer races and also flows through the openings in the release sleeve to the bushing.

9. The clutch release bearing assembly of claim 1 wherein the bearing is a sealed bearing having at least one axial side that has a seal extending across the space between the inner and outer races on the second opening of the housing.

10. A clutch for a vehicle comprising:
    a clutch housing;
    an input shaft received in the clutch housing and being rotatable relative to the housing;
    a clutch plate assembly that transfers torque from the input shaft;
    a diaphragm spring operatively connected to the clutch plate assembly;
    a release bearing assembly including:
    a housing in which the input shaft is received;
    a release sleeve having a first end and a second end, the first end of the release sleeve is received in the housing, and the second end of the release sleeve engages the diaphragm spring, wherein the release sleeve is slidably received on an input shaft;
    a bushing retained in the release sleeve, the bushing having a side wall that defines plurality of openings, wherein the bushing is slidably received on the input shaft;
    a bearing assembled to the first end of the release bearing sleeve, the bearing having an inner race secured to the release sleeve and an outer race that supports the inner race for rotation with the input shaft on anti-friction bearings; and
    wherein the housing defines a grease reservoir collectively with the release sleeve and, wherein openings are defined in the release sleeve through which grease is distributed to the bushing, and wherein grease is provided through the bushing to the input shaft through the openings in the bushing.

11. The clutch release bearing assembly of claim 10 further comprising a seal assembled between the housing and the release sleeve on an end of the housing closest to the clutch.

12. The clutch release bearing assembly of claim 10 further comprising an annular cover seal that is assembled over the end of the housing facing away from the clutch that spans the outer race and extends to the inner race.

13. The clutch release bearing assembly of claim 12 further comprising a zerk fitting through which the grease is injected into the grease reservoir.

14. The clutch release bearing assembly of claim 12 herein the annular cover seal is secured to the housing such that the housing that applies an axial force to the outer race of the bearing to pre-load the outer race thereby fixing the outer race to the housing.

15. The clutch release bearing assembly of claim 10 further comprising at least one anti-rotation flange formed on the housing that is secured to the clutch to prevent rotation of the housing.

16. The clutch release bearing assembly of claim 10 wherein the bearing has an inboard side that faces the clutch and an outboard side that faces away from the clutch and wherein the grease reservoir is defined on the inboard side of the bearing between the housing and the release sleeve.

17. The clutch release bearing assembly of claim 10 wherein the grease flows from the grease reservoir between the inner and outer races and also flows through the openings in the release sleeve to the bushing.

18. The clutch release bearing assembly of claim 10 wherein the bearing is a sealed bearing having at least one axial side that has a seal extending across the space between the inner and outer races on an end of the housing that faces away from the clutch.

19. A clutch release bearing assembly for a clutch, the assembly comprising:
   a housing;
   a release sleeve having a first end and a second end, the first end of the release sleeve received in the housing, and the second end of the release sleeve engages the clutch, wherein the release sleeve is slidably received on an input shaft;
   a bushing retained in the release sleeve, the bushing having a side wall that defines plurality of openings, wherein the bushing is slidably received on an input shaft;
   a sealed bearing assembled to the first end of the release sleeve, the bearing having an inner race secured to the release sleeve, an outer race that supports the inner race for rotation with the input shaft on anti-friction bearings, and a seal enclosing the bearing on a first axially oriented side and on a second oriented axial side and the seal secured to the housing; and
   wherein the housing defines a grease reservoir for receiving and distributing a supply of grease to the bushing, wherein openings are defined in the release sleeve through which grease is distributed to the bushing, and wherein grease is provided through the bushing to the input shaft through the openings in the side wall of the bushing.

20. The clutch release bearing assembly of claim 19 wherein the housing is a bell shaped housing having a first opening facing away from the clutch in which the sealed bearing is disposed and a second opening facing the clutch in which the release sleeve is received, and further comprising a radially inwardly extending member that exerts an axial pre-load force on the sealed bearing to retain the sealed bearing in the housing.

* * * * *

UNITED STATES PATENT AND TRADEMARK OFFICE
CERTIFICATE OF CORRECTION

PATENT NO. : 7,712,595 B2  Page 1 of 1
APPLICATION NO. : 11/708249
DATED : May 11, 2010
INVENTOR(S) : Steven E. McCutcheon et al.

It is certified that error appears in the above-identified patent and that said Letters Patent is hereby corrected as shown below:

Column 5, Line 61, Claim 2:

After "sleeve" delete "on".

Column 6, Line 66, Claim 14:

After "claim 12" delete "herein" and insert -- wherein --.

Column 7, Line 1, Claim 14:

After "the housing" delete "that".

Signed and Sealed this

Twenty-seventh Day of July, 2010

David J. Kappos
*Director of the United States Patent and Trademark Office*